(12) United States Patent
Fu et al.

(10) Patent No.: US 11,928,460 B2
(45) Date of Patent: Mar. 12, 2024

(54) DYNAMIC UPDATE OF A COMPUTER PROGRAM IN MEMORY

(71) Applicant: INTERNATIONAL BUSINESS MACHINES CORPORATION, Armonk, NY (US)

(72) Inventors: Jin Hong Fu, Beijing (CN); Bao Zhang, Beijing (CN); Shi Chong Ma, Beijing (CN); He Huang, Beijing (CN); Naijie Li, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/659,864

(22) Filed: Apr. 20, 2022

(65) Prior Publication Data
US 2023/0342142 A1    Oct. 26, 2023

(51) Int. Cl.
*G06F 9/44*        (2018.01)
*G06F 8/658*      (2018.01)
(Continued)

(52) U.S. Cl.
CPC ............ *G06F 8/658* (2018.02); *G06F 9/3009* (2013.01); *G06F 12/0238* (2013.01); *G06F 12/0804* (2013.01)

(58) Field of Classification Search
None
See application file for complete search history.

(56) References Cited

U.S. PATENT DOCUMENTS 9,256,419 B2    2/2016  Mannarswamy
9,430,224 B2 *  8/2016  Zhang .................... G06F 8/656
(Continued)

FOREIGN PATENT DOCUMENTS

CN    109725923 A    5/2019
CN    111831296 A   10/2020
(Continued)

OTHER PUBLICATIONS

Notification of Transmittal of the International Search Report and the Written Opinion of the International Searching Authority, or the Declaration, dated Jun. 19, 2023, International application No. PCT/CN2023/087582, 7 pages.
(Continued)

*Primary Examiner* — Qamrun Nahar
(74) *Attorney, Agent, or Firm* — Yuanmin Cai

(57) ABSTRACT

Embodiments of the present disclosure relate to a method, system, and computer program product for dynamic update of a computer program in memory. According to the method, one or more processors obtain incremental information, the incremental information specifying an incremental update to at least one section of at least one target function in a computer program. One or more processors identify, based on the incremental information, the at least one target function to be updated from the computer program. One or more processors generate at least one updated copy of the at least one target function by updating the at least one section of the at least one target function based on the incremental information. One or more processors update the computer program based on the at least one updated copy of the at least one target function while the computer program is running.

20 Claims, 10 Drawing Sheets

(51) Int. Cl.
    *G06F 9/30*           (2018.01)
    *G06F 12/02*         (2006.01)
    *G06F 12/0804*     (2016.01)

(56) References Cited

U.S. PATENT DOCUMENTS

| | | | |
|---|---|---|---|
| 10,108,410 B2 | 10/2018 | Mahajan | |
| 10,698,668 B1* | 6/2020 | Pohlack | G06F 8/71 |
| 2016/0196116 A1* | 7/2016 | Li | G06F 8/658 |
| | | | 717/110 |
| 2018/0032441 A1* | 2/2018 | De | G06F 11/3612 |
| 2018/0143823 A1* | 5/2018 | Han | G06F 8/658 |
| 2018/0321953 A1* | 11/2018 | Khazanovitch | G06F 8/658 |

FOREIGN PATENT DOCUMENTS

| | | |
|---|---|---|
| CN | 112925552 A | 6/2021 |
| CN | 113377412 A | 9/2021 |
| WO | 2021115477 A1 | 6/2021 |

OTHER PUBLICATIONS https://en.wikipedia.org/wiki/Dynamic_software_updating, "Dynamic software updating", Wikipedia, Accessed on Mar. 29, 2022, 5 pages.
Mell et al., "The NIST Definition of Cloud Computing", Recommendations of the National Institute of Standards and Technology, Special Publication 800-145, Sep. 2011, 7 pages.
Pending U.S. Appl. No. 17/501,018, entitled: "Reducing a Delivery Size of a Software Update", filed Oct. 14, 2021, 38 pages.

\* cited by examiner

DYNAMIC UPDATE OF A COMPUTER PROGRAM IN MEMORY

BACKGROUND

The present disclosure generally relates to computer science techniques and more particularly, to a method, system, and computer program product for dynamic update of a computer program in memory.

A computer program, such as an operation system or an application program, may be updated or patched incrementally. Updating or patching the computer program generally requires a cold start time to restart the computer program. This means that program fixes or updates cannot be applied to a system without restarting the computer program after experiencing some downtime to accomplish the restarting operation. While some "hot patch" capabilities have been made possible, these "hot patch" capabilities are limited to only a few specific extensions and also have low efficiency.

SUMMARY

According to one embodiment of the present disclosure, there is provided a computer-implemented method. According to the method, one or more processors obtain incremental information, the incremental information specifying an incremental update to at least one section of at least one target function in a computer program. One or more processors identify, based on the incremental information, the at least one target function to be updated from the computer program. One or more processors generate at least one updated copy of the at least one target function by updating the at least one section of the at least one target function based on the incremental information. One or more processors update the computer program based on the at least one updated copy of the at least one target function while the computer program is running.

According to a further embodiment of the present disclosure, there is provided a system. The system comprises a processing unit; and a memory coupled to the processing unit and storing instructions thereon. The instructions, when executed by the processing unit, perform acts of the method according to the embodiments of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
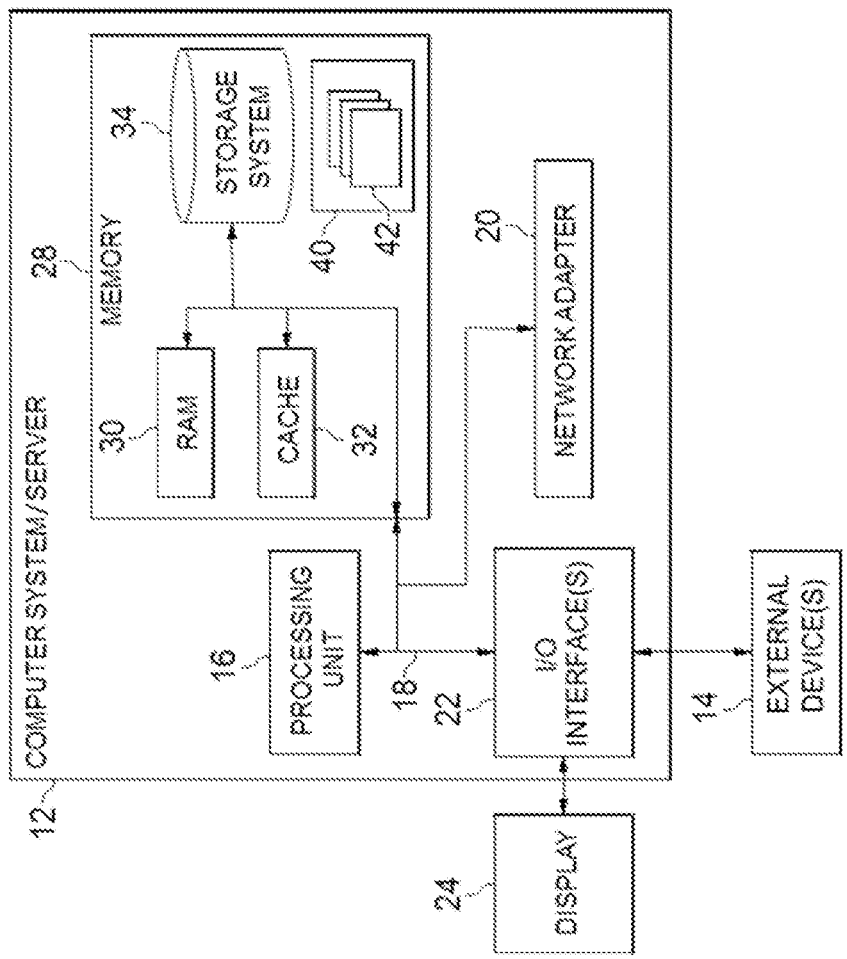
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
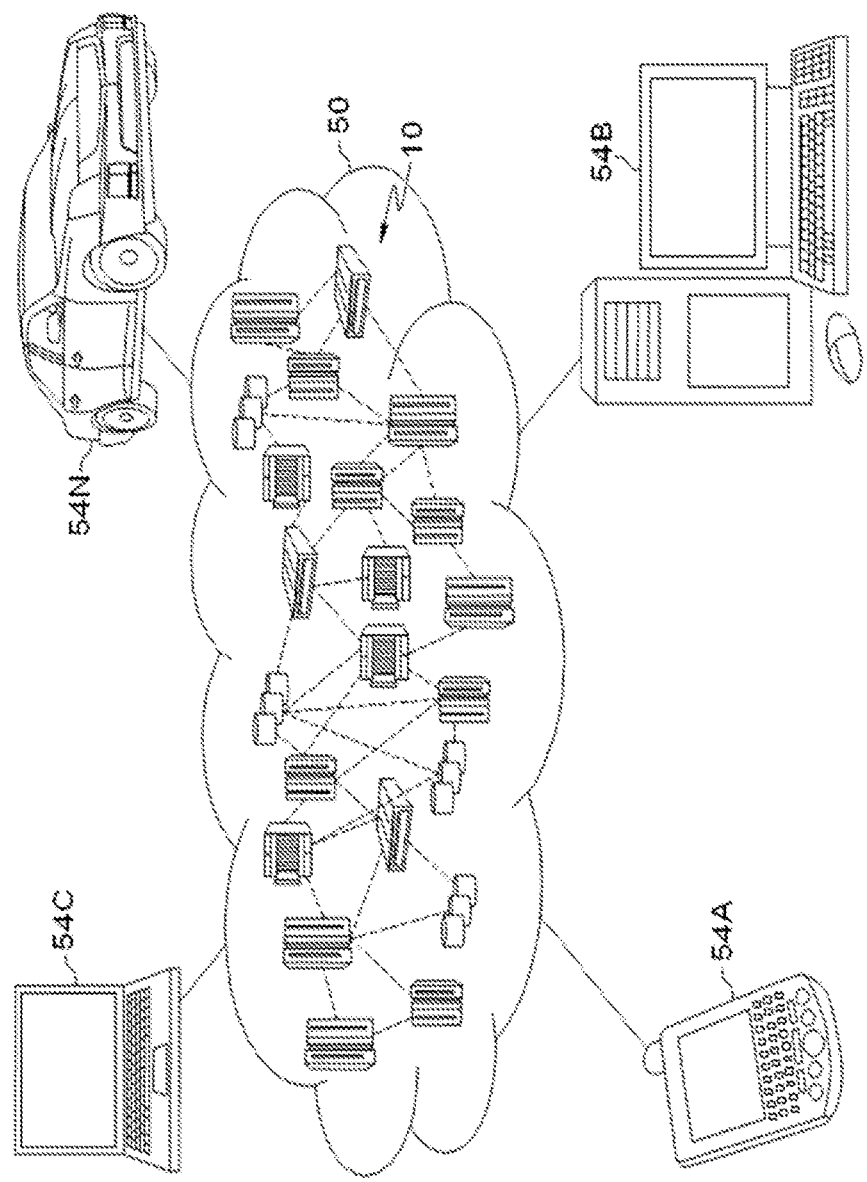
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, automobile computer system 54N, and/or the computer system/server 12 of FIG. 1 may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
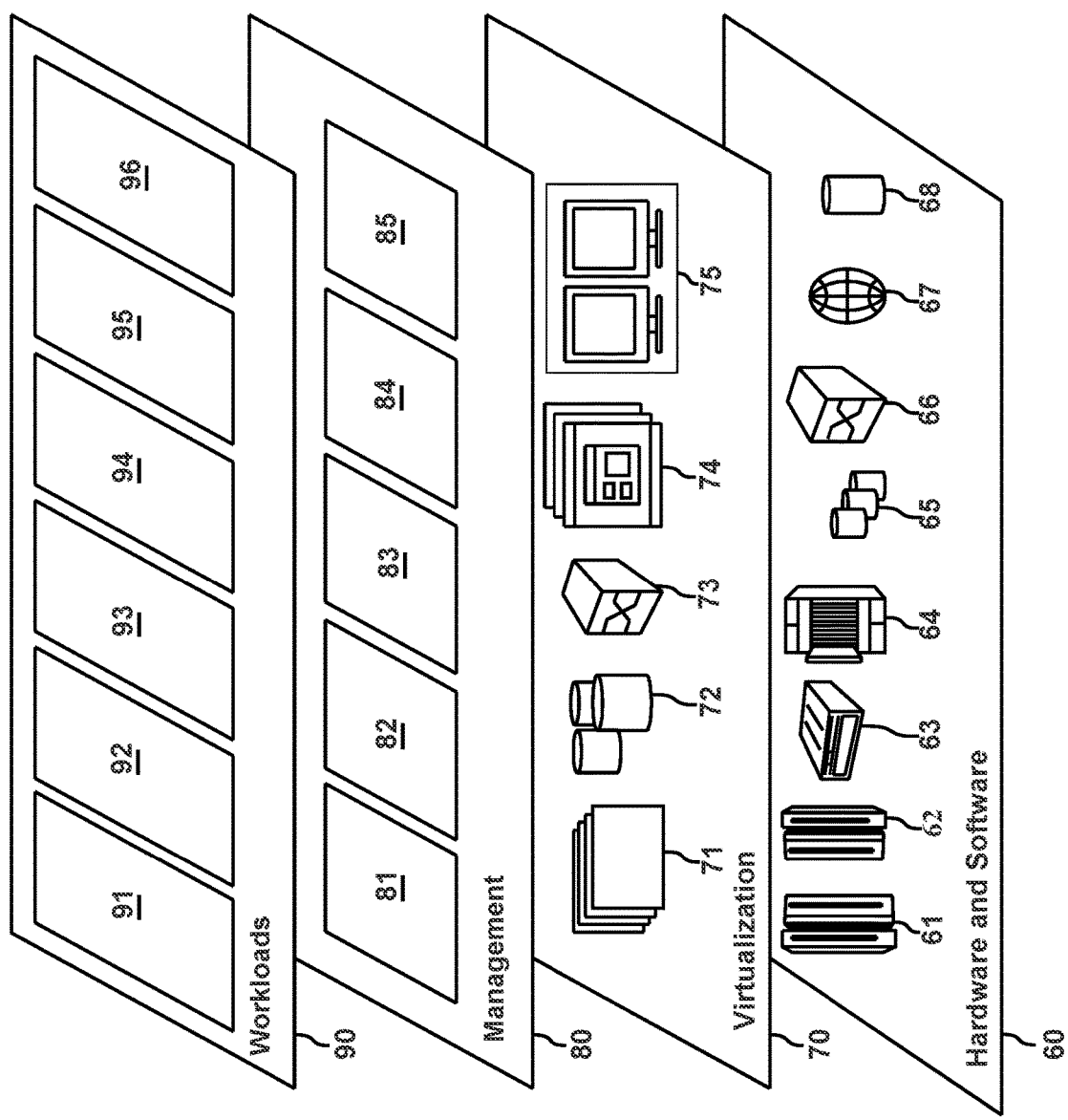
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic program update 96. The functionalities of dynamic program update 96 will be described in the following embodiment of the present disclosure.

To update a computer program, a typical way is to stop the computer program to perform the updates or fixes and then restart the computer program. This requires a cold start time for the update. This type of update operation is disruptive to the user experience, and therefore refrains many software providers from releasing updates frequently. In particular, for a long running program, such as an operation system or middle ware, the time and money cost for the update is considerable. Even for a short running program, if the program is instantiated in multiple containers in a cloud platform and the initialization container or function container is updated, all the containers will be shut down and then restarted with updates. This may also cause the provisioned services interrupted.

There are some existing dynamic program update approaches, such as DYMOS and Ksplice, which uses lazy updating and eager updating to allow "hot patch" to a program in memory. However, these dynamic program update approaches may also stop all the processes of the program, which is known as "Stop The World" when updating. In addition, the developers need to prepare and specify the "update point" in the program or prepare and specify the mapping between stack frames. The minimum updating unit is a function. If the instruction(s) to be updated in a program is quite mini while the corresponding function is huge, this results in waste of memory and time. Ksplice is a registered trademark of Oracle International Corporation.

Therefore, it is desirable for a way to update a computer program in memory more efficiently.

According to example embodiments of the present disclosure, there is proposed an improved solution for dynamic update of a computer program in memory. In this solution, one or more specific target functions to be updated in the computer program are identified. One or more specific sections of the one or more target functions are updated based on incremental information, to generate one or more corresponding updated copies of the one or more target functions. The one or more corresponding updated copies of the one or more target functions are used to update the computer program while the computer program is running.

In this way, instead of specifying and updating the whole function, one or more specific sections of a function in the computer program can be automatically updated by providing the incremental information. The computer program can be updated incrementally with incremental information while the computer program is running. Thus, the time efficiency for the program update is increased while cost is reduced. The computer program is not stopped, and the corresponding service will not be interrupted due to the update.

Other advantages of the present disclosure will be described with reference to the example embodiments and the accompanying drawings below.

Figure 4:
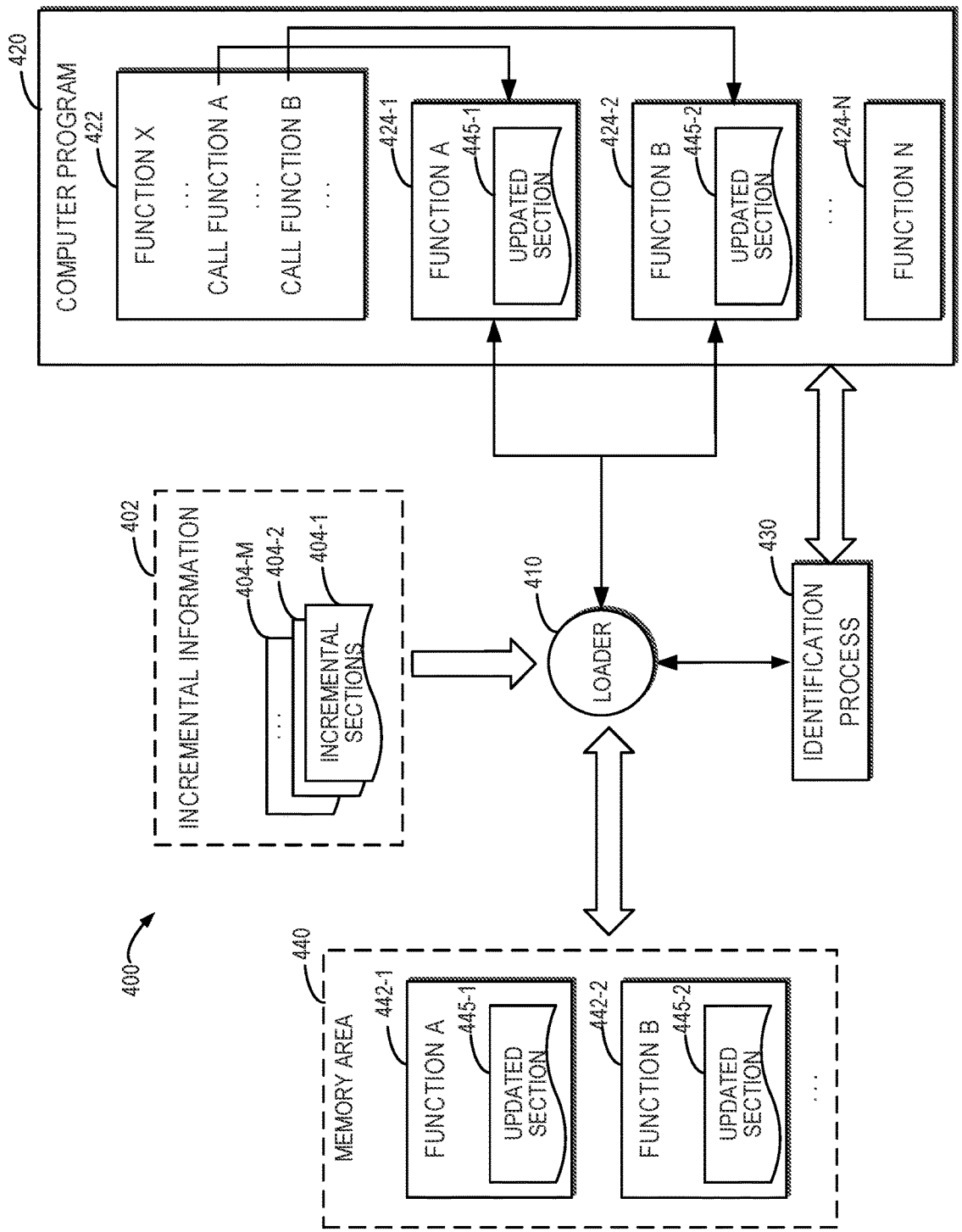
FIG. 4 depicts a block diagram of a system for program update according to some embodiments of the present disclosure.

Reference is first made to FIG. 4. FIG. 4 depicts a block diagram of a system 400 for program update according to some embodiments of the present disclosure.

As illustrated in FIG. 4, the system 400 comprises a loader 410 configured to apply update to a computer program 420. The computer program 420 contains one or more functions, including a function 422 (represented as Function X), and functions 424-1, 424-2, . . . 424-N (represented as Function A, Function B, . . . , Function N, respectively). As an example, the function 422 calls the functions 424-1 and 424-2, shown as call function A and call function B, respectively. The computer program 420 may be any program executable in a computing system. As some examples, the computer program 420 may include an operating system, a middleware, an application program, and so on. The term "computer program" may sometimes be referred to as a program, a piece of software, an application, or the like.

The loader 410 may be implemented as a software module to implement the program update. In the embodiments of the present disclosure, the loader 410 may operate with an identification process 430 to apply the program update.

Figure 5:
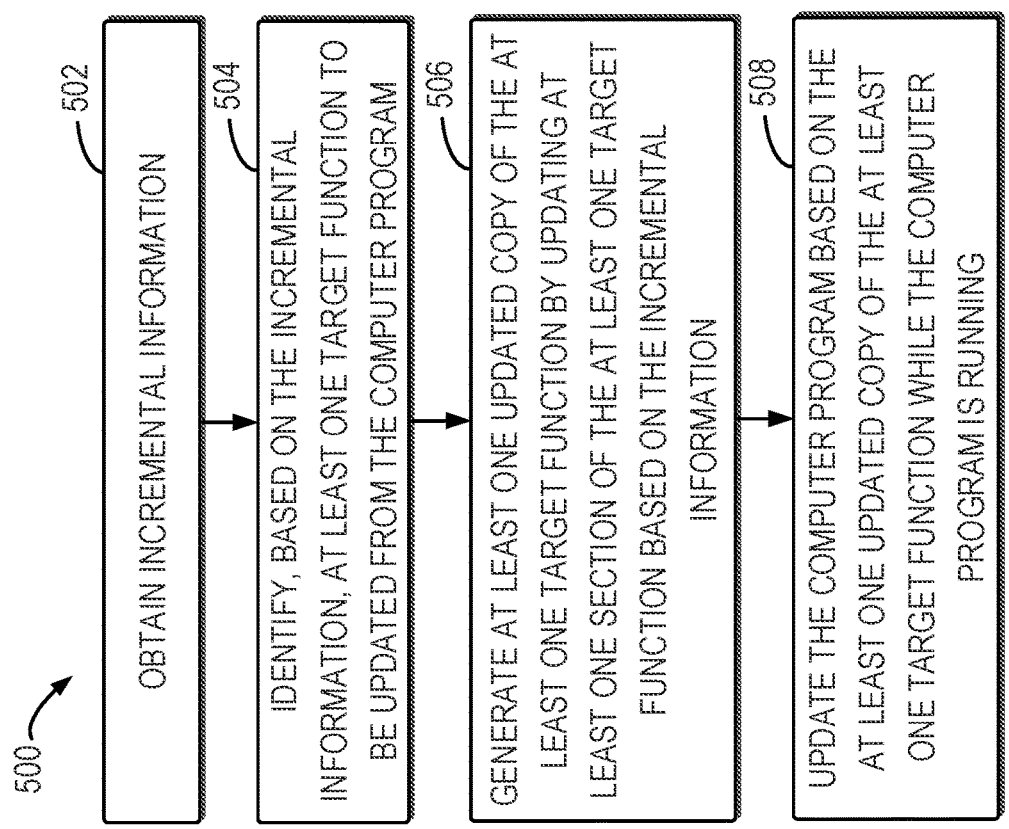
FIG. 5 depicts a flowchart of an example process for program update according to some embodiments of the present disclosure.

An example process 500 for program update according to some embodiments of the present disclosure is illustrated in FIG. 5, and this process can be implemented at the system 400, more specifically, by the loader 410 and the identification process 430. To better illustrate the embodiments of the present disclosure, the process 500 is described with reference to FIG. 4.

At block 502, the system 400, e.g., the loader 410 obtains (e.g., loads) incremental information 402. The incremental information 402 includes one or more incremental sections 404-1, 404-2, . . . , 404-M (collectively or respectively referred to as incremental sections 404). Each incremental section 404 indicates an incremental update to a section of a function in the computer program 420. That is, the incremental section 404 may specify a specific section (e.g., one or more lines of code or instructions) of a function to be updated in the computer program 420. The function to be updated in the computer program 420 may also be referred to as a target function. As an example, the incremental section 404-1 may specify an incremental update to a section of the function 424-1, the incremental section 404-2 may specify an incremental update to a section of the function 424-2, and so on. A function that can be incrementally updated by the incremental section may also be referred to as an incremental loaded function.

An incremental update to a section of a function may indicate any updating action, such as a Replace action, an Add action, or a Delete action. The section to be updated may include a code section, a symbol section, or a local or global data section. In some embodiments, the developer may specify how a section of a function is updated. The incremental information 402, e.g., the incremental sections 404, may be generated from the specification of the developer, for example, after the compiling process.

At block 504, the system 400, e.g., the identification process 430, may identify, based on the incremental information 402, the at least one target function to be updated from the computer program 420. The loader 410, responsive to receiving the incremental information 402, may cause the identification process 430 to identify the target function(s) specified by the incremental information as 'to be updated'.

The identification process 430 may notify the loader 410 the at least one target function specified by the incremental information as 'to be updated'. At block 506, the system 400, e.g., the loader 410 generates at least one updated copy of the at least one target function by updating the at least one section of the at least one target function based on the incremental information.

In some embodiments, the loader 410 may load or copy the at least one target function (for example, the functions 424-1 and 424-2) from the computer program 420 into a memory area 440 accessible by the computer program 420. The loader 410 loads the incremental information 402 and then updates the at least one target function in the memory area 440 by generating the at least one updated copy of the at least one target function, for example, an updated copy 442-1 of the function 424-1 (Function A), and an updated copy of the function 424-2 (Function B).

The loader 410 may generate an updated copy of a function based on the corresponding incremental section 404 in the incremental information 402 which specifies the incremental update to a section of this function. As mentioned above, a function may be divided into a symbol section which defines symbols used in the function, a code section which defines functionality, and a data section which indicates data or values occurred in the function. Depending on the section to be updated in a function and the specific updating action, an updated copy may be generated in different ways.

Figure 6:
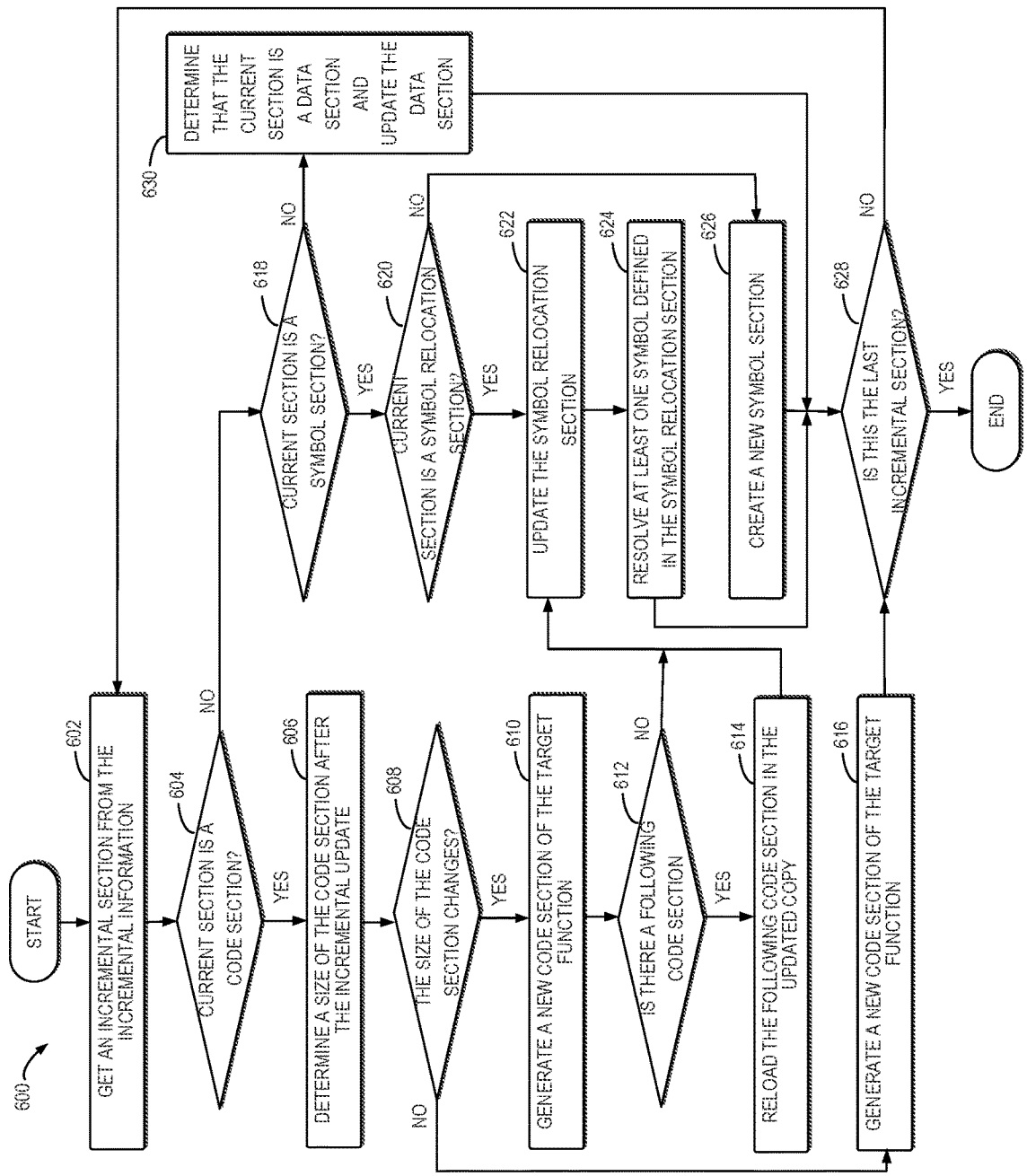
FIG. 6 illustrates a flowchart of an example process for generating at least one updated copy of at least one target function according to some embodiments of the present disclosure.

FIG. 6 illustrates a flowchart of an example process 600 for generating at least one updated copy of at least one target function according to some embodiments of the present disclosure. The example process 600 may be implemented at the loader 410.

Specifically, at block 602, the loader 410 gets an incremental section 404 from the incremental information 402. The incremental section 404 specifies an incremental update to a section of a certain target function. At block 604, the loader 410 determines whether a current section of the target function to be updated is a code section. This current section of the target function is the section that is specified as 'to be updated' in the incremental section 404.

If the incremental section 404 specifies an incremental update to a code section, the loader 410 may determine that the current section of the target function to be updated is a code section and follow a "yes" path to proceed to block 606. Then at block 606, the loader 410 determines a size of the code section after the incremental update. In some cases, if the incremental update is to add or delete one or more instructions in the code section, the size of the code section may change after the addition or deletion.

At block 608, the loader 410 determines whether the size of the code section changes after the incremental update. In the case that the size of the code section changes, following a "yes" path of block 608, at block 610 the loader 410 generates a new code section of the target function based on the incremental update specified in the incremental section 404, in order to generate an updated copy of the target function. As the size of this code section changes, at block 612, the loader 410 determines whether there is a following code section in the target function, i.e., a further code section follows the current code section. If there is a following code section, at block 614 following the "yes" path of block 612, the loader 410 reloads the following code section in the updated copy of the target function. Of course, if there is any code section before the current updated code section, the updated code section may append to that code section, to form the updated copy of the target function.

For a certain target function, in the case where the size of the code section changes after the incremental update, to generate a complete updated copy of the target function, a symbol section of the target function may also be updated. Thus, if there is no following code section ("no" path of block 612) or after the following code section is reloaded at block 614, the process 600 proceeds to block 622 where the loader 410 updates a symbol relocation section of the target function. A symbol relocation section of a function generally defines offsets of symbols in a function. As the size of the code section changes, the offsets of the symbols may also change. Thus, the loader 410 may update the symbol relocation section accordingly. Further, after the symbol relocation section is updated, at block 624, the loader 410 resolves at least one symbol defined in the symbol relocation section.

In some embodiments, if the size of the code section changes, especially if the size of the code section increases, the original storage space for storing the original target function may not be suitable for the updated copy of the target function. In this case, the loader 410 may request a new memory segment for storing the updated copy of the target function. As a result, the memory address of the updated copy of the target function may be different from the memory address of the original target function.

In some cases, if the loader 410 determines at block 608 that the size of the code section remains unchanged after the incremental update ("no" path of block 608), then the process 600 proceeds to block 616 where the loader 410 generates a new code section of the target function based on the incremental update, to generate the updated copy of the target function. The remaining sections of the target function can remain unchanged in the updated copy.

After the new code section is generated at block 616 or the at least one symbol is resolved at block 624, the updated copy of the target function is generated and stored in the memory area 440. Then at block 628, the loader 410 checks the incremental information 402 to determine whether the current incremental section is the last incremental section. If it is not the last incremental section, following the "no" path at block 628, the process 600 may turn back to block 602, to get another incremental section 404 from the incremental information 402 and the following operations are repeated. If the current incremental section is the last incremental section, following the "yes" bath at block 628, the example process 600 is ended.

In some embodiments, if it is determined at block 604 that the current section of the target function is not a code section, following the "no" path of block 604, the loader 410 further determines, at block 618, whether the current section is a symbol section. In the case that a symbol section is to be updated, following the "yes" path of block 618, the loader 410 further determines, at block 620, whether the symbol section is a symbol relocation section. If the incremental section specifies certain incremental update to the symbol relocation section, following the "yes" path to block 620, and the loader 410 updates, at block 622, the symbol relocation section based on the incremental update, to form an updated copy of the target function. Due to the update to the symbol relocation section, at block 624, the loader 410 resolves at least one symbol defined in the symbol relocation section, and continues to block 628 as described above.

In some embodiments, if the incremental section does not specify an update to the symbol relocation section, following the "no" path of block 620, but to other type of symbol section, at block 626, the loader 410 creates a new symbol section based on the incremental update, to generate the updated copy of the target function. For example, the loader 410 may create a temporary section for a compiler or a symbol table section.

After the new symbol section is created at block 626 or the at least one symbol is resolved at block 624, the updated copy of the target function is generated and stored in the memory area 440. Then the process 600 proceeds to block 628 to determine whether the current incremental section is the last incremental section. If it is not the last incremental section, following the "no" path of block 628, the process 600 may turn back to block 602, to get another incremental section 404 from the incremental information 402 and the following steps are repeated.

In some embodiments, if the current section is neither a code section nor a symbol section, following the "no path of block 618, then at block 630, the loader 410 determines that the current section is a data section and then updates the data section of the target function based on the incremental update. Generally, the update to the data section is to replace a value with another value. For such update, the loader 410 may directly update the data section of the target function to form an updated copy. Then the process 600 proceeds to block 628 to determine whether the current incremental section is the last incremental section.

After all the incremental sections 404 in the incremental information 402 are checked, the loader 410 may generate all the updated copies of the target functions.

Reference is made back to FIG. 5, in the process 500, at block 508, the system 400, e.g., the loader 410, updates the computer program based on the at least one updated copy of the at least one target function while the computer program is running.

In some embodiments, the loader 410 may refresh the at least one target function included in the computer program with the at least one updated copy. For example, the loader 410 may refresh the target function 424-1 in the computer program 420 with the updated copy 442-1 stored in the memory area 440, and refresh the target function 424-2 in the computer program 420 with the updated copy 442-2 stored in the memory area 440.

In some embodiments, for a certain target function, there may be one or more functions in the computer program 420 (e.g., the function 422 in the computer program 420) that call one or more target function. A function that calls another function is referred to as a caller function of the other function. If the memory address of an updated copy of a target function is different from the original memory address of this target function, the loader 410 may modify the memory address of the target function in the at least one caller function to be the memory address of the updated copy. That is, in addition to the at least one target function that is explicitly specified as 'to be updated' in the incremental information 402, there may be some caller functions that also need to be updated in the computer program 420.

Figure 7:
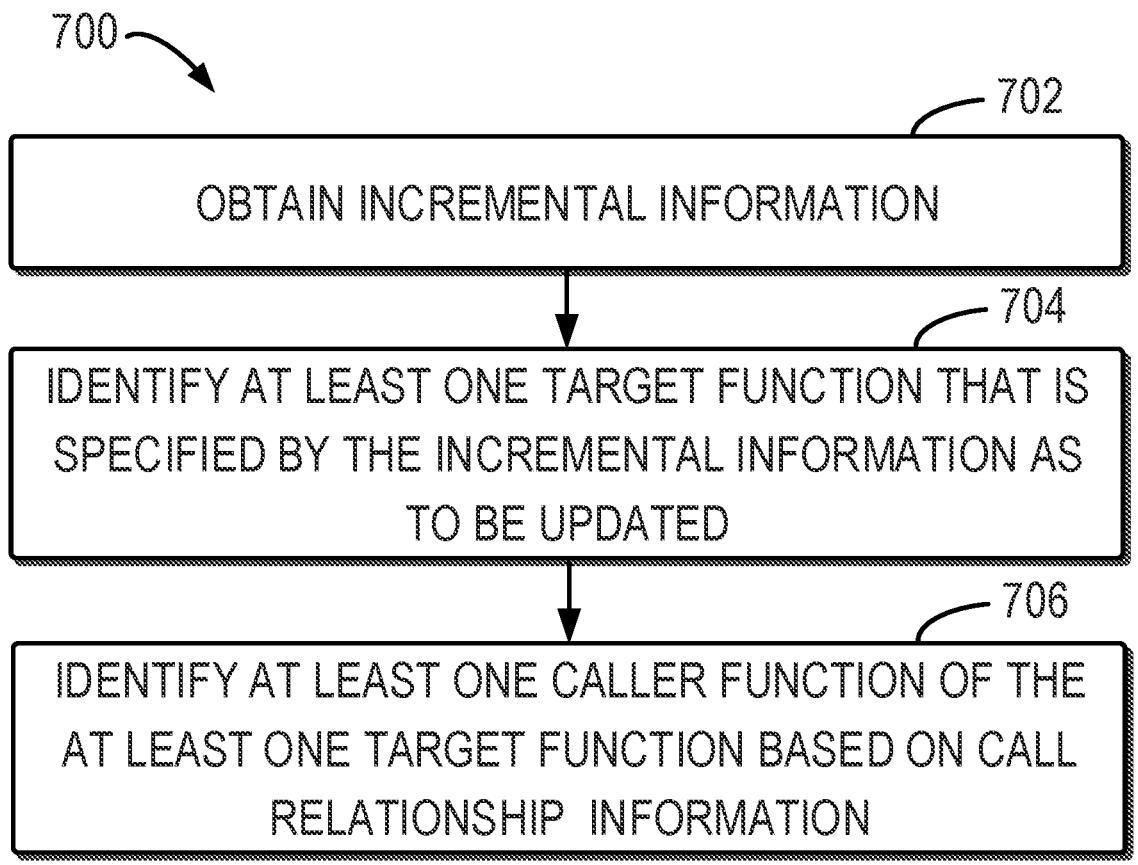
FIG. 7 illustrates a flowchart of an example process for function identification according to some embodiments of the present disclosure.

In some embodiments, the identification of the caller function(s) of the at least one target function from the computer program 420 is performed by the identification process 430, in addition to the identification of the at least one target function. FIG. 7 illustrates a flowchart of an example process 700 for function identification according to some embodiments of the present disclosure. The example process 700 is considered as an overall process for function identification that is implemented by the identification process 430.

Specifically, at block 702, the identification process 430 obtains the incremental information 402, for example, from the loader 410. At block 704, the identification process 430 identifies the at least one target function from the computer program 420 that is specified by the incremental information as 'to be updated'. This operation is similar to the operation at the block 504 in the process 500.

At block 706, the identification process 430 further identifies at least one caller function of the at least one target function based on call relationship information related to the computer program 420. The call relationship information indicates a function call relationship in the computer program 420. For example, the call relationship information may include a call graph of the computer program 420 which includes all the function calls in the computer program 420. The identification process 430 may determine, from the call relationship information, if there is any caller function to any of the at least one target function.

Figure 8:
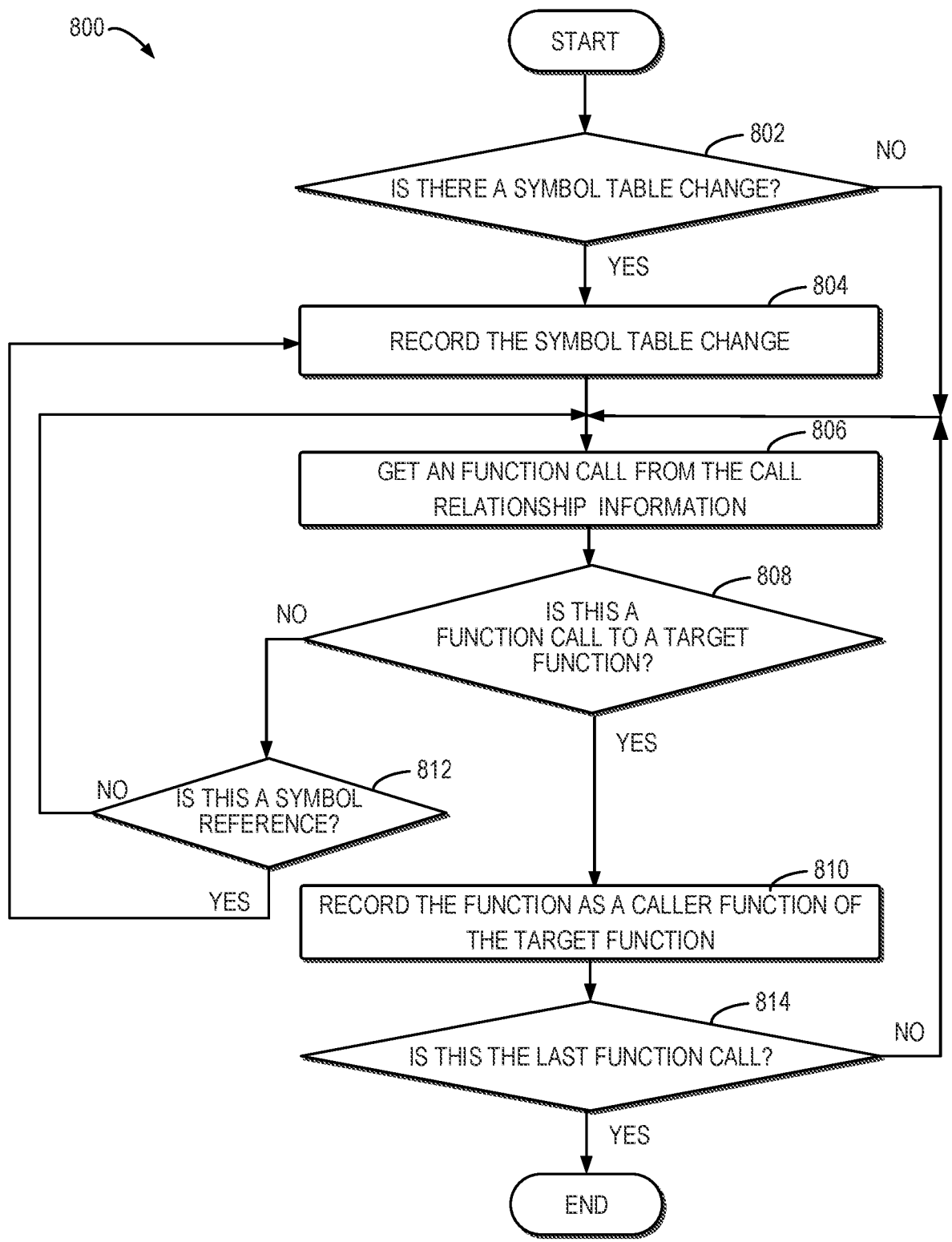
FIG. 8 illustrates a flowchart of an example process for identifying a caller function according to some embodiments of the present disclosure.

FIG. 8 illustrates a flowchart of an example process 800 for identifying a caller function according to some embodiments of the present disclosure. The process 800 may be considered as some embodiments of the identification of the at least one caller function at block 706.

Specifically, after identifying at least one target function that is specified by the incremental information as 'to be updated', at block 802, the identification process 430 determines, based on the incremental information 402, if there is any symbol table change to the computer program 420. For example, the identification process 430 may determine if there is any incremental section 404 that specifies an update to a symbol section. Following the "yes" path of block 802, having determined there is there is a symbol table change, at block 804, the identification process 430 records the symbol table change.

If there is no symbol table change following the "no" path of block 802, or after recording the symbol table change of block 804, the process 800 proceeds to block 806 where the identification process 430 gets a function call from the call relationship information. Then at block 808, the identification process 430 determines whether this is a function call to a target function in the computer program 420. If this is a function call to a target function, following the "yes" path of block 808, then at block 810, the identification process 430 records the corresponding function as a caller function to the target function. Otherwise, if this is not a function call to the target function, following the "no" path of block 808, then at block 812, the identification process 430 determines if this is a symbol reference in the computer program 420. If the function call indicates a symbol reference in the computer program 420, following the "yes" path of block 812, the process 800 turns to block 804 where identification process 430 records the symbol table change due to the symbol reference. In the case that the function call is not a symbol reference, following the "no" path of block 812, the process 800 turns to block 806 where the identification process 430 gets another function call from the call relationship information and repeats the following operations.

In the case where the call function is recorded at block 810, the identification process 430 determines, at block 814, whether the current function call is the last function call in the call relationship information. If there is one or more further function calls, following the "no" path of block 814, the process 800 turns back to block 806 to get another function call from the call relationship information and repeats the following operations. When the current function call is the last function call, following the "yes" path of block 814, the process 800 ends.

In some embodiments, after all the function calls in the call relationship information are checked, the identification process 430 may determine one or more caller functions for one or more target functions. The identification process 430 may notify the loader 410 of the identification result of the one or more caller functions as well as the identification result of the at least target function. The loader 410 may then perform the incremental loading of the target function(s) in the computer program 420, to complete the program update.

The loader 410 may generate the at least one updated copy of the at least one target function based on the identification result of the at least target function from the identification process 430, and may also update the computer program 420 based on the at least one updated copy of the at least one target function and the identification result of the one or more caller functions, as discussed above.

In some embodiments, since it is expected to update the computer program 420 while it is running, in order to avoid interruption to the program execution, the update may be performed in a suitable time slot. In some embodiments, the identification process 430 may be configured to determine such a suitable time slot for performing the program update and notify the loader 410 of the time slot.

Figure 9:
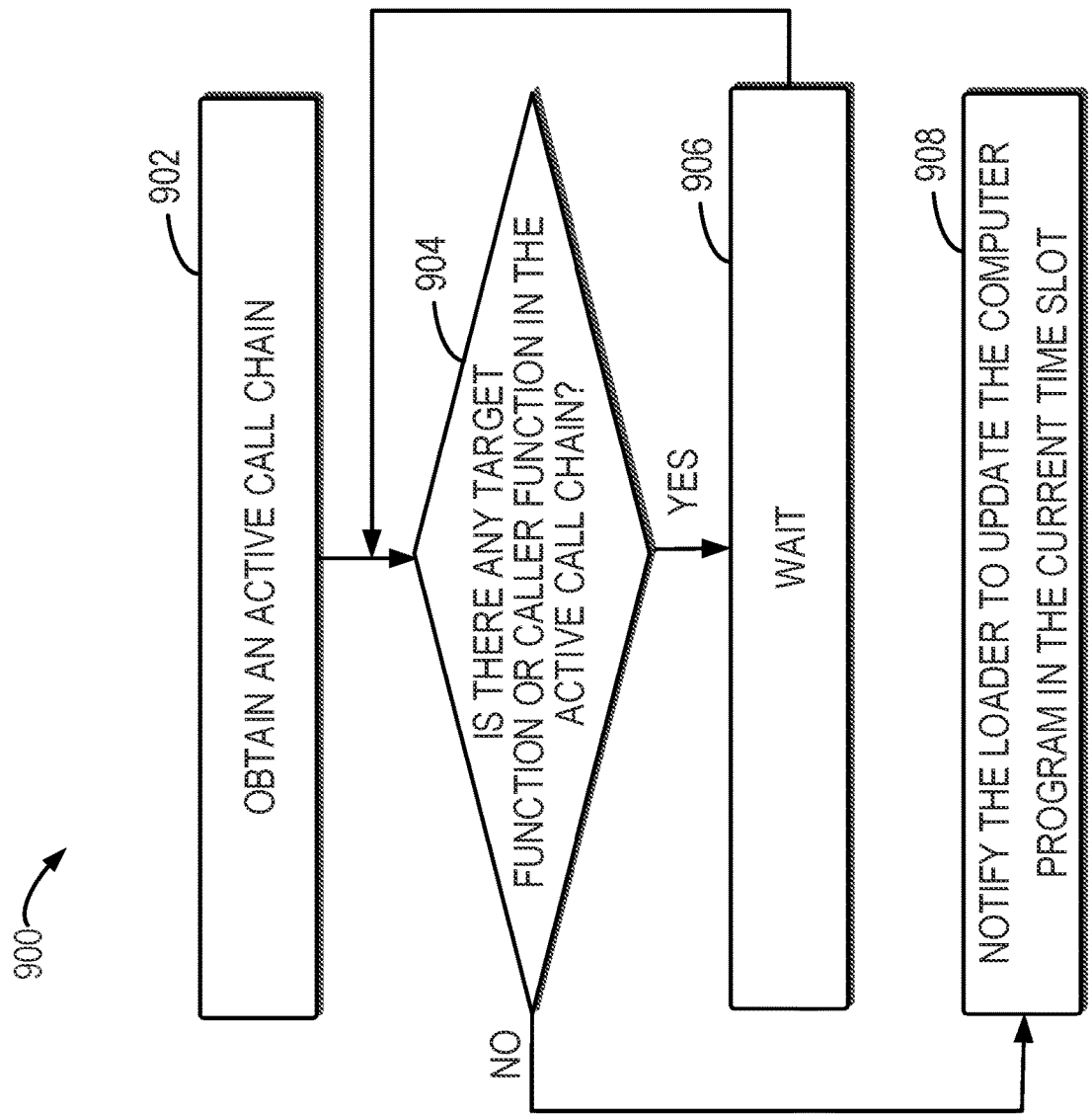
FIG. 9 illustrates a flowchart of an example process for determining a time slot for program update according to some embodiments of the present disclosure.

FIG. 9 illustrates a flowchart of an example process 900 for determining a time slot for program update according to some embodiments of the present disclosure. The process 900 may be implemented at the identification process 430.

At block 902, the identification process 430 obtains an active call chain in an execution task where the computer program 420 is running. The active call chain indicates at least one function of the computer program running in the execution task. In some embodiments, the identification process 430 may obtain a top stack pointer of the computer program 420 and determine a call stack trace based on the top stack pointer. The call stack trace may indicate all the active function calls in the current execution task of the computer program 420. If a function of the computer program 420 is called in the active function call, it means that this function is currently running. Thus, the identification process 430 may format the active call chain in the execution task.

At block 904, the identification process 430 determines if there is any target function in the active call chain. If there is any one or more target functions in the active call chain, which means that those target functions are running, following the "yes" path of block 904, the identification process 430 waits at block 906 for the running of the target functions. The identification process 430 may check the active call chain periodically.

In some embodiments, in addition to the at least one target function specified as 'to be updated' by the incremental information 402, there may be one or more caller functions of the at least one target function that are also to be updated. In this case, the identification process 430 may also determine if there is any caller function in the active call chain.

If it is determined that no target function or caller function of the target function in the active call chain, then the identification process 430 may determine that the at least one target function and its caller function(s) are not running in the current time slot. Following the "no" path of block 904, the identification process 430 notifies, at block 908, the loader 410 to update the computer program 420 in the current time slot based on the at least one updated copy of the at least one target function. For example, as mentioned above, the loader 410 may refresh the at least one target function in the computer program 420 with the updated copy or modify the memory address of the at least one target function in its caller function with the new memory address of the updated copy.

In some embodiments, the computer program 420 may be a multi-thread program, and thus may be running in a plurality of threads of the execution task. In this case, a function may be called to be running in more than one thread. The identification process 430 may monitor each of the plurality of threads to get an active chain that can indicate all the functions running in the plurality of threads of the execution task. In this way, the identification process 430 may be able to determine a proper time slot where no target function or its caller function is running and notify the loader 410 to perform the program update in this proper time slot.

According to the embodiments of the present disclosure, the updating unit for the computing program is at binary instruction level, which means that the incremental information may specify any granularity in the function to be updated in the computer program.

Figure 10:
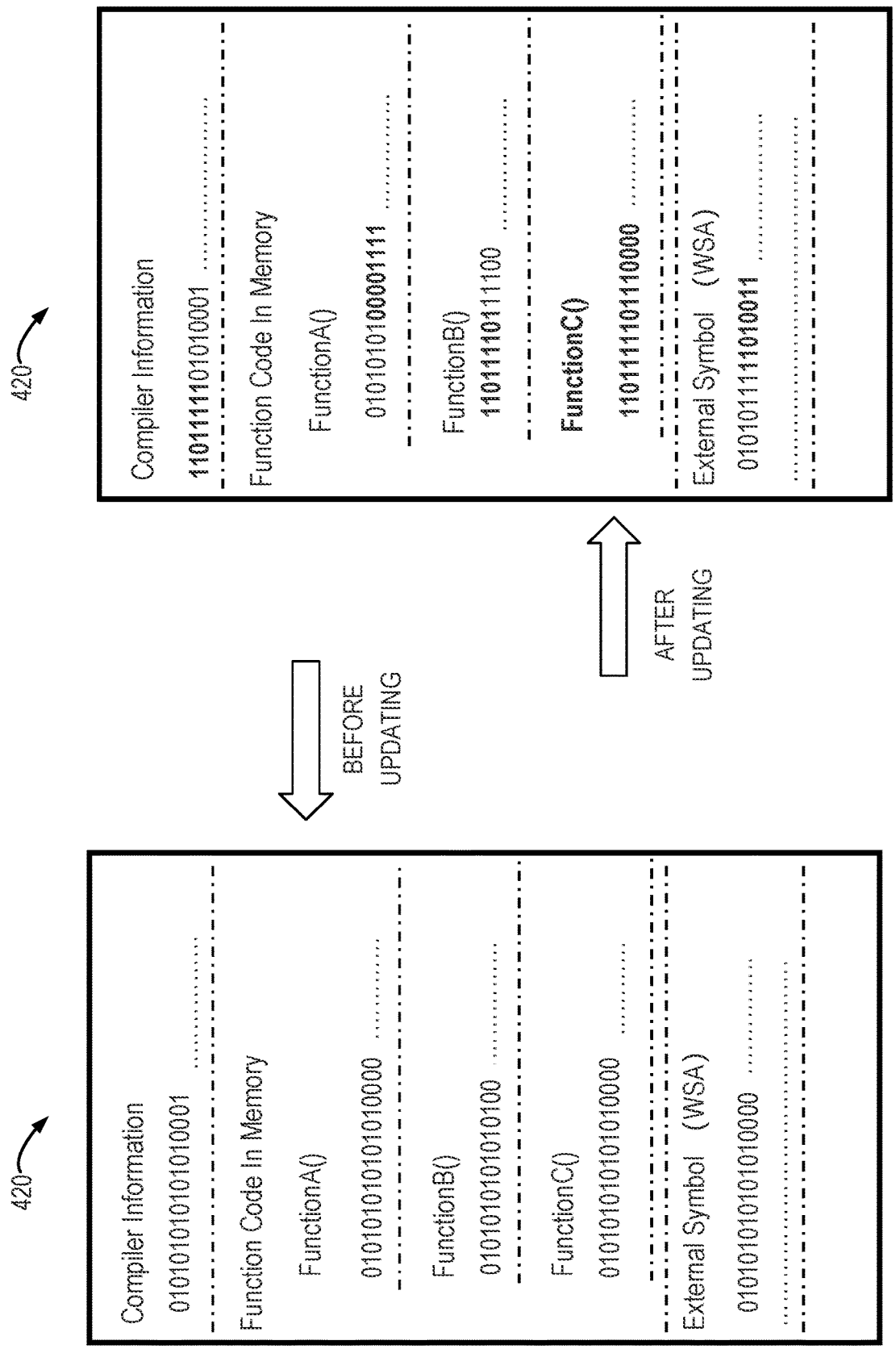
FIG. 10 illustrates an example of a computer program before and after updating according to some embodiments of the present disclosure.

FIG. 10 illustrates an example of the computer program 420 before and after updating. As illustrated, specific sections in the compiler information, Function A, Function B, and External Symbol may be updated as highlighted in bold. The updates are at binary instruction level. Of course, the update to a whole function, for example, Function C in the example of FIG. 10, is also supported according to the embodiments of the present disclosure.

It should be noted that the order of the operations in any of the processes 600, 700, 800, and 900 is illustrated for the purpose of discussion. The order of some operations may be changed and some operations may be performed in parallel.

It should be noted that the system 400 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, incremental information specifying an incremental update to at least one section of at least one target function in a computer program;
    identifying, by the one or more processors, the at least one target function to be updated from the computer program based on the incremental information;
    generating, by the one or more processors, at least one updated copy of the at least one target function by updating the at least one section of the at least one target function based on the incremental information; and
    updating, by the one or more processors, the computer program based on the at least one updated copy of the at least one target function while the computer program is running, wherein updating the computer program comprises:
        obtaining, by the one or more processors, an active call chain in an execution task where the computer program is running, the active call chain indicating at least one target function of the computer program running in the execution task;
        determining, by the one or more processors, a time slot when the at least one target function is not running in the execution task based on the active call chain; and updating, by the one or more processors, the computer program within the determined time slot.

2. The computer-implemented method of claim 1, wherein generating the at least one updated copy of the at least one target function comprises:
   loading, by the one or more processors, the at least one target function into a memory area accessible by the computer program; and
   generating, by the one or more processors, the at least one updated copy of the at least one target function in the memory area.

3. The computer-implemented method of claim 1, wherein generating the at least one updated copy of the at least one target function comprises:
   in accordance with a determination that the incremental information indicates a first incremental update to a code section of a first target function, determining, by the one or more processors, whether a size of the code section changes after the first incremental update;
   in accordance with a determination that the size of the code section changes after the first incremental update, generating, by the one or more processors, an updated copy of the first target function by:
   generating a new code section of the target function based on the first incremental update,
   in accordance with a determination that a further code section follows the code section in the first target function, reloading the further code section in the updated copy,
   updating a symbol relocation section of the first target function, and
   resolving at least one symbol defined in the symbol relocation section.

4. The computer-implemented method of claim 3, wherein generating the at least one updated copy of the at least one target function further comprises:
   in accordance with a determination that the size of the code section remains unchanged after the first incremental update, generating, by the one or more processors, the updated copy of the first target function by:
   generating a new code section of the first target function based on the first incremental update.

5. The computer-implemented method of claim 3, wherein generating the at least one updated copy of the at least one target function further comprises:
   in accordance with a determination that the size of the code section increases after the first incremental update, storing, by the one or more processors, the updated copy of the first target function at a memory address different from a memory address of the first target function.

6. The computer-implemented method of claim 1, wherein generating the at least one updated copy of the at least one target function further comprises:
   in accordance with a determination that the incremental information indicates a second incremental update to a symbol section of a second target function, determining, by the one or more processors, whether the symbol section is a symbol relocation section;
   in accordance with a determination that the symbol section is a symbol relocation section, generating, by the one or more processors, an updated copy of the second target function by:
   updating the symbol relocation section of the second target function based on the second incremental update, and
   resolving at least one symbol defined in the symbol relocation section; and
   in accordance with a determination that the symbol section is not a symbol relocation section, creating, by the one or more processors, a new symbol section in the second updated copy based on the second incremental update.

7. The computer-implemented method of claim 1, wherein generating the at least one updated copy of the at least one target function comprises:
   in accordance with a determination that the incremental information indicates a third incremental update to a data section of a third target function, generating, by the one or more processors, an updated copy of the third target function by:
   updating the data section of the third target function based on the third incremental update.

8. The computer-implemented method of claim 1, wherein updating the computer program comprises:
   refreshing, by the one or more processors, the at least one target function with the at least one updated copy.

9. The computer-implemented method of claim 1, wherein updating the computer program comprises: for a given target function of the at least one target function,
   identifying, by the one or more processors, at least one caller function in the computer program that calls the given target function based on call relationship information related to the computer program; and
   in accordance with a determination that a memory address of the given target function is different from a memory address of an updated copy of the given target function, modifying, by the one or more processors, the memory address of the given target function in the at least one caller function to be the memory address of the updated copy of the given target function.

10. The computer-implemented method of claim 1, wherein the active call chain indicates at least one target function of the computer program running in a plurality of threads of the execution task.

11. A computer-implemented method comprising:
    obtaining, by one or more processors, incremental information specifying an incremental update to at least one section of at least one target function in a computer program;
    identifying, by the one or more processors, the at least one target function to be updated from the computer program based on the incremental information;
    generating, by the one or more processors, at least one updated copy of the at least one target function by updating the at least one section of the at least one target function based on the incremental information; and
    updating, by the one or more processors, the computer program based on the at least one updated copy of the at least one target function while the computer program is running, wherein updating the computer program comprises:
    for a given target function of the at least one target function, identifying, by the one or more processors, at least one caller function in the computer program that calls the given target function based on call relationship information related to the computer program;
    in accordance with a determination that a memory address of the given target function is different from a memory address of the updated copy of the given target function; and modifying, by the one or more processors, the memory address of the given target function in the at least one caller function to be the memory address of the updated copy of the given target function.

12. The computer-implemented method of claim 11, wherein generating the at least one updated copy of the at least one target function comprises:
    in accordance with a determination that the incremental information indicates a first incremental update to a code section of a first target function, determining, by the one or more processors, whether a size of the code section changes after the first incremental update;
    in accordance with a determination that the size of the code section changes after the first incremental update, generating, by the one or more processors, an updated copy of the first target function by:
        generating a new code section of the target function based on the first incremental update,
        in accordance with a determination that a further code section follows the code section in the first target function, reloading the further code section in the updated copy,
        updating a symbol relocation section of the first target function, and
        resolving at least one symbol defined in the symbol relocation section.

13. The computer-implemented method of claim 11, wherein generating the at least one updated copy of the at least one target function further comprises:
    in accordance with a determination that the size of the code section remains unchanged after the first incremental update, generating, by the one or more processors, the updated copy of the first target function by:
        generating a new code section of the first target function based on the first incremental update.

14. The computer-implemented method of claim 13, wherein generating the at least one updated copy of the at least one target function further comprises:
    in accordance with a determination that the size of the code section increases after the first incremental update, storing, by the one or more processors, the updated copy of the first target function at a memory address different from a memory address of the first target function.

15. The computer-implemented method of claim 13, wherein generating the at least one updated copy of the at least one target function further comprises:
    in accordance with a determination that the incremental information indicates a second incremental update to a symbol section of a second target function, determining, by the one or more processors, whether the symbol section is a symbol relocation section;
    in accordance with a determination that the symbol section is a symbol relocation section, generating, by the one or more processors, an updated copy of the second target function by:
        updating the symbol relocation section of the second target function based on the second incremental update, and
        resolving at least one symbol defined in the symbol relocation section;
    in accordance with a determination that the symbol section is not a symbol relocation section, creating, by the one or more processors, a new symbol section in the second updated copy based on the second incremental update.

16. The computer-implemented method of claim 11, wherein updating the computer program comprises:
    obtaining, by the one or more processors, an active call chain in an execution task where the computer program is running, the active call chain indicating at least one target function of the computer program running in the execution task, wherein the active call chain indicates at least one target function of the computer program running in a plurality of threads of the execution task;
    determining, by the one or more processors, a time slot when the at least one target function is not running in the execution task based on the active call chain; and
    updating, by the one or more processors, the computer program within the determined time slot.

17. A computer-implemented method comprising:
    obtaining, by one or more processors, incremental information specifying an incremental update to at least one section of at least one target function in a computer program;
    identifying, by the one or more processors, the at least one target function to be updated from the computer program based on the incremental information;
    generating, by the one or more processors, at least one updated copy of the at least one target function by updating the at least one section of the at least one target function based on the incremental information, wherein generating the at least one updated copy of the at least one target function further comprises:
    in accordance with a determination that the incremental information indicates a second incremental update to a symbol section of a second target function, determining, by the one or more processors, whether the symbol section of the second incremental update is a symbol relocation section;
    in accordance with a determination that the symbol section is a symbol relocation section, generating, by the one or more processors, an updated copy of the second target function by: updating the symbol relocation section of the second target function based on the second incremental update, and resolving at least one symbol defined in the symbol relocation section;
    in accordance with a determination that the symbol section of the second incremental update is not a symbol relocation section, creating, by the one or more processors, a new symbol section in the second updated copy based on the second incremental update; and
    updating, by the one or more processors, the computer program based on the at least one updated copy of the at least one target function while the computer program is running.

18. The computer-implemented method of claim 17, wherein generating the at least one updated copy of the at least one target function comprises:
    in accordance with a determination that the incremental information indicates a first incremental update to a code section of a first target function, determining, by the one or more processors, whether a size of the code section changes after the first incremental update;
    in accordance with a determination that the size of the code section changes after the first incremental update, generating, by the one or more processors, an updated copy of the first target function by:
        generating a new code section of the target function based on the first incremental update, in accordance with a determination that a further code section follows the code section in the first target function, reloading the further code section in the updated copy, updating a symbol relocation section of the first target function, and resolving at least one symbol defined in the symbol relocation section.

19. The computer-implemented method of claim 18, wherein generating the at least one updated copy of the at least one target function further comprises:

in accordance with a determination that the size of the code section remains unchanged after the first incremental update, generating, by the one or more processors, the updated copy of the first target function by:

generating a new code section of the first target function based on the first incremental update.

20. The computer-implemented method of claim 18, wherein generating the at least one updated copy of the at least one target function further comprises:

in accordance with a determination that the size of the code section increases after the first incremental update, storing, by the one or more processors, the updated copy of the first target function at a memory address different from a memory address of the first target function.

* * * * *